(12) United States Patent
Olah et al.

(10) Patent No.: US 12,509,983 B2
(45) Date of Patent: Dec. 30, 2025

(54) SYSTEM AND METHOD FOR BOND LOG ANALYSIS

(71) Applicant: Texas Institute of Science, Inc., Richardson, TX (US)

(72) Inventors: Laslo Olah, Richardson, TX (US); Kirk Lane Harris, Lafayette, LA (US); Gergely Sebestyen, Budapest (HU)

(73) Assignee: Texas Institute of Science, Inc., Richardson, TX (US)

( * ) Notice: Subject to any disclaimer, the term of this patent is extended or adjusted under 35 U.S.C. 154(b) by 0 days.

(21) Appl. No.: 19/191,758

(22) Filed: Apr. 28, 2025

(65) Prior Publication Data

US 2025/0250893 A1    Aug. 7, 2025

Related U.S. Application Data

(63) Continuation-in-part of application No. 18/753,233, filed on Jun. 25, 2024, now Pat. No. 12,435,616, which is a continuation-in-part of application No. 18/538,168, filed on Dec. 13, 2023, now abandoned.

(60) Provisional application No. 63/589,204, filed on Oct. 10, 2023.

(51) Int. Cl.
E21B 47/005    (2012.01)
(52) U.S. Cl.
CPC .................. E21B 47/005 (2020.05)
(58) Field of Classification Search
CPC .................................................. E21B 47/005
See application file for complete search history.

(56) References Cited

U.S. PATENT DOCUMENTS

| | | | |
|---|---|---|---|
| 3,729,705 | A | 4/1973 | Grijalva |
| 6,011,557 | A | 1/2000 | Keskes et al. |
| 6,560,540 | B2 | 5/2003 | West et al. |
| 6,662,112 | B2 | 12/2003 | Eastwood et al. |
| 7,310,580 | B2 | 12/2007 | Zhou et al. |

(Continued)

FOREIGN PATENT DOCUMENTS

WO    2018232134    12/2018

*Primary Examiner* — Elias Desta
(74) *Attorney, Agent, or Firm* — Scott Griggs; Griggs Bergen LLP

(57) ABSTRACT

A bond-log interpretation system, apparatus, and computer-implemented method are disclosed. The system ingests a cement-bond log (CBL) containing variable-density log (VDL) data and at least one secondary data track (SDT). A processing core, coupled to toggleable lithology, casing-tally, cementing-data, and prior-CBL libraries, first executes a VDL-only assessment at each depth to flag possible discontinuities. For every flagged depth, the core correlates the concurrent SDT data with selected library information to confirm or clear the discontinuity, delineate imperfect intervals, and identify probable causes. Results are synthesized into an annotated integrity report that includes audit-trail metadata listing which libraries were enabled. In a multi-well deployment, multiple field units synchronize their libraries with a central repository over a secure network, allowing real-time, parallel analysis and fleet-wide visualization. The modular architecture permits on-the-fly enabling, disabling, and versioning of libraries while maintaining a single interpretation engine adaptable to diverse tools and formations.

26 Claims, 5 Drawing Sheets

(56) References Cited

U.S. PATENT DOCUMENTS

| | | | |
|---|---|---|---|
| 9,651,699 B2 | 5/2017 | Snow et al. | |
| 9,797,240 B2 * | 10/2017 | Tunget | E21B 33/13 |
| 10,858,933 B2 | 12/2020 | Bose et al. | |
| 11,746,643 B2 * | 9/2023 | Zhang | G01V 1/50 |
| | | | 367/35 |
| 11,946,359 B2 * | 4/2024 | Adewuya | E21B 47/11 |
| 2002/0099504 A1 | 7/2002 | Cross et al. | |
| 2002/0183930 A1 | 12/2002 | Plona et al. | |
| 2003/0156494 A1 | 8/2003 | McDaniel | |
| 2004/0176911 A1 | 9/2004 | Bratton et al. | |
| 2006/0074825 A1 | 4/2006 | Mirowski | |
| 2009/0192718 A1 | 7/2009 | Zhang et al. | |
| 2014/0052376 A1 | 2/2014 | Guo et al. | |
| 2015/0234954 A1 | 8/2015 | Samuel et al. | |
| 2018/0142544 A1 | 5/2018 | Kolchanov et al. | |
| 2020/0072036 A1 | 3/2020 | Wang | |
| 2022/0074299 A1 | 3/2022 | Li et al. | |
| 2022/0146701 A1 | 5/2022 | Lemarenko et al. | |
| 2025/0116184 A1 | 4/2025 | Olah et al. | |

\* cited by examiner

SYSTEM AND METHOD FOR BOND LOG ANALYSIS

PRIORITY STATEMENT & CROSS-REFERENCE TO RELATED APPLICATIONS

This application is a continuation-in-part of U.S. patent application Ser. No. 18/753,233, entitled "Bond Log Analysis Apparatus and System and Method for Use of Same" and filed on Jun. 25, 2024, in the name of Laslo Olah et al.; which is a continuation-in-part of U.S. patent application Ser. No. 18/538,168, entitled "Bond Log Analysis Apparatus and System and Method for Use of Same" and filed on Dec. 13, 2023, in the name of Laslo Olah et al.; which claims priority from U.S. Provisional Patent Application No. 63/589,204, entitled "Bond Log Analysis Apparatus and System and Method for Use of Same" and filed on Oct. 10, 2023, in the name of Laslo Olah et al.; all of which are hereby incorporated by reference, in entirety, for all purposes.

TECHNICAL FIELD OF THE INVENTION

This invention relates, in general, to cement bond log analysis and interpretation and, in particular, to a bond log analysis system and method for use of same for interpreting surveys and evaluations of downhole environments at oil and gas reservoirs, including wellbores and casings as well as cemented annular spaces therebetween.

BACKGROUND OF THE INVENTION

Establishing and monitoring well integrity is one of the most important aspects of the development of oil and gas wells. Standard non-invasive methods to survey and evaluate the integrity of cement-casing well barriers in downhole environments are utilized to produce a bond log. The bond log is then interpreted by a registered professional engineer or other expert to ensure the cement between the steel well casings and the geologic formation supports the casing, prevents gas and fluid from leaking to the surface, and provides isolation between water-bearing and producing zones, for example. The heavy reliance on registered professional engineers and other experts, however, leads to inconsistent interpretations of bond logs. Accordingly, there is a need for improved systems and methods to improve bond log interpretation.

SUMMARY OF THE INVENTION

It would be advantageous to provide a bond-log interpretation apparatus, system, and computer-implemented method that transcend the functional limits of conventional methodologies. The teachings presented herein disclose a modular, library-driven architecture in which a processing core interfaces with toggleable data libraries—e.g., lithology, casing tally, cementing history, prior CBLs, and logging-tool specifications. Because each library can be enabled, disabled, or versioned on the fly, a single interpretation engine becomes universally compatible with bond-logging tools from different manufacturers and readily adaptable to varied field conditions. When deployed across multiple wells, a plurality of field units synchronize their libraries with a central repository over a secure network, permitting real-time, parallel analysis and fleet-wide visualization while preserving well-specific evaluations.

In operation, the system receives a Cement Bond Log (CBL) in its Digital Log Information Standard (DLIS) format. It includes Variable Density Log (VDL) data and at least one Secondary Data Track (SDT). For each discrete depth module, an initial VDL-only assessment classifies the depth module as possible discontinuity. Every flagged depth is then re-examined and analyzed by correlating the concurrent SDT data with the currently enabled libraries to determine a probable cause and to confirm or clear the discontinuity. Confirmed discontinuities then are grouped by vertical position to delineate imperfect intervals, after which the processor synthesizes all findings into an integrity report.

The system is realized by a processor, non-transitory memory, data storage, the aforementioned toggleable libraries, communication interfaces, and—optionally—a central library repository and edge caches. The processor executes instructions to ingest down-hole DLIS files, uses VDL as first analysis, uses SDT in corresponding depths to perform second analysis, then delineate imperfect intervals as final analysis before generating integrity report. The processor retrieves reference data from enabled libraries, perform the multi-stage analysis, and generate an annotated report that includes an audit trail identifying which libraries and versions were active. Machine-learning or rule-based optimization may continuously refine thresholds and workflows as additional interpreted logs are added to the libraries. Accordingly, the invention affords high-accuracy evaluation of cement integrity, early detection of anomalies, and field-wide management of wellbore remediation strategies, all while maintaining a single, extensible interpretation platform. The teachings presented herein move bond log interpretation from inconsistent interpretation by registered professional engineers and other experts, into a rule based methodology relying on data and analysis.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
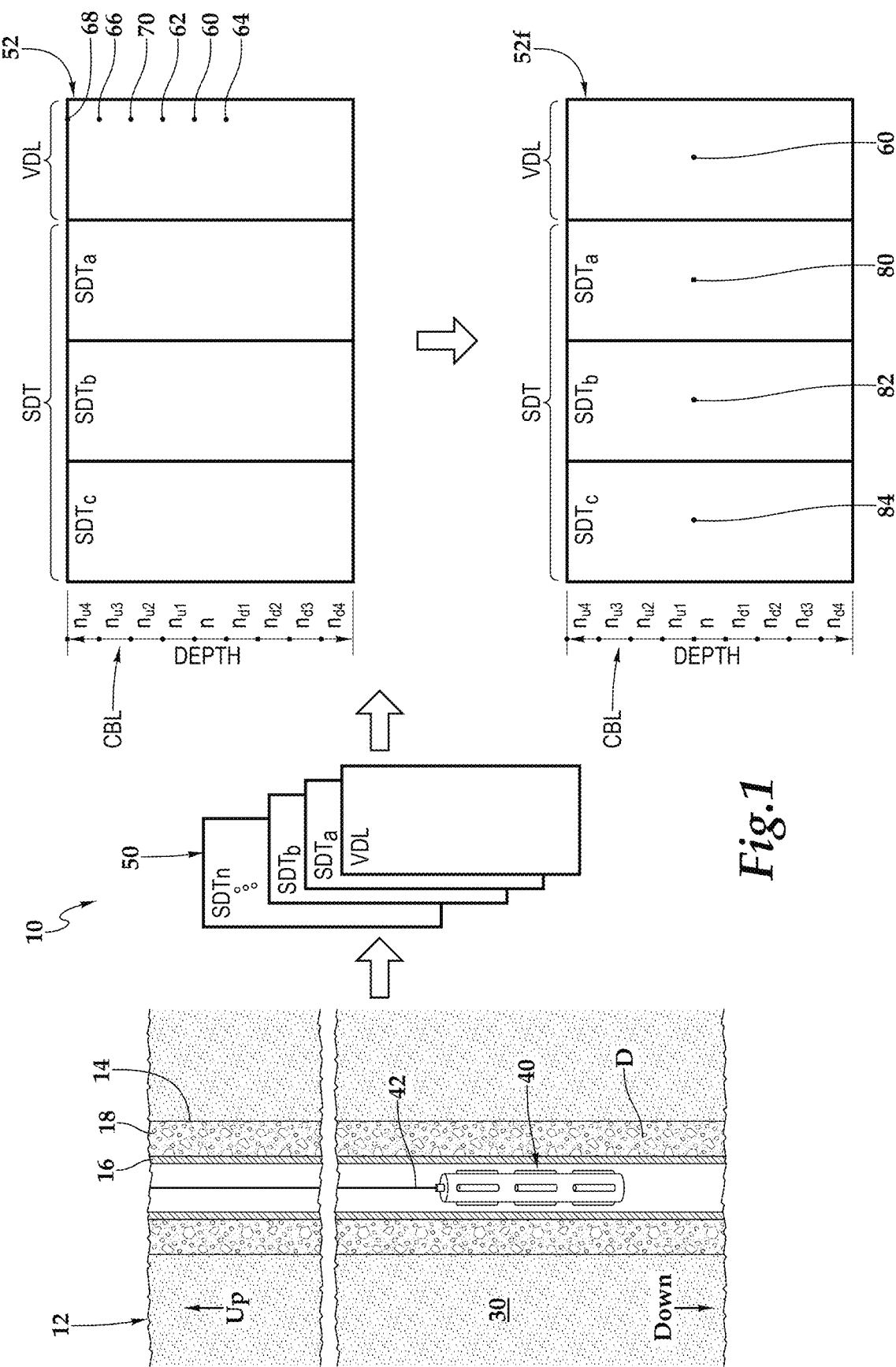
FIG. 1 is a hybrid functional schematic and block diagram depicting one embodiment of a system for bond log analysis, according to the teachings presented herein.

Referring initially to FIG. 1, therein is depicted one embodiment of a system for bond log analysis 10 relative to a hydrocarbon production operation 12. By way of example, a wellbore 14 extends through various earth strata, including the subterranean hydrocarbon formation 16. The wellbore 14 is lined with a casing string 16, which is cemented into place with cement 18. As shown, the hydrocarbon production operation 12 includes a subterranean hydrocarbon formation 30 located below the surface. A logging apparatus 40 is secured to line 42. In operation, with the use of data from the logging apparatus 40, the system 10 identifies discontinuities D in the casing string 16 and its proximity.

By way of example, and not by way of limitation, the logging apparatus 40 may obtain sonic data from the media along the casing string 16 and the wellbore 14. In some embodiments, the logging apparatus 40 operates by emitting an acoustic or sonic wave into the wellbore 14 and the subterranean hydrocarbon formation 30. The emitted sonic wave interacts with the media, altering its characteristics, and a modified reflected wave returns to the logging apparatus 40. Characteristics such as amplitude, frequency, and phase of the emitted and modified reflected waves from the logging apparatus 40 and/or other instruments form bond log data 50. As shown, the bond log data 50 may be a Cement Bond Log (CBL) that includes a Variable Density Log (VDL) and several Secondary Data Tracks (SDTs), specifically $SDT_A$, $SDT_B$ through $SDT_n$.

The VDL is a fundamental part of all CBLs and includes one or more VDL signals. It provides a visual representation of the acoustic waveform data from the downhole environment, which is crucial in identifying cement bonding conditions. The VDL's importance lies in its ability to capture a wide range of data, including amplitude and phase information, which can reveal intricate details about the cement bond quality. The system introduced herein is designed to conduct a comprehensive analysis of the VDL, including VDL signals, at areas, zones, or points 60, 62, 64, 66, 68, 70, for example. This analysis aims to identify characteristics and patterns related to cement bonding conditions. The identification of these characteristics and patterns is a critical step in the process as it serves to determine the necessity for further examination using SDTs.

The SDTs provide additional, more specific data that can enhance the understanding of the cement bond conditions. However, analyzing all SDTs for all areas within the CBL can be time-consuming and may not always be necessary. By first analyzing adjacent areas or zones within the VDL, the system can make an informed decision about whether further examination of the SDTs is required. This approach is not only efficient but also ensures that the analysis is focused on the areas that need the most attention, thereby saving time while still ensuring a comprehensive and accurate analysis. That is, the analysis of the VDLs determines if a depth is clear or if a possible discontinuity is present and further analysis using the SDTs is required.

The bond log 52, generated from the bond log data 50, includes the VDL and several SDTs, specifically $SDT_a$, $SDT_b$, and $SDT_n$. Although three SDTs are illustrated, it should be appreciated that any number of SDTs may be utilized based on the tool's manufacturer and applied technology. The bond log 52 details depth n and its adjacent depths, labeled as $n_{u1}$, $n_{u2}$, $n_{u3}$, and $n_{u4}$ uphole, and $n_{d1}$, $n_{d2}$, $n_{d3}$, and $n_{d4}$ downhole. The process involves an initial analysis at depth n, which may determine whether the section is acceptable or problematic, where there may be a possible discontinuity and further investigation is required in the adjacent depths to determine the span of the possible discontinuity. At the end of the VDL examination, the system either concludes that a particular section is clear or the particular section includes a possible discontinuity on its own or that the above and below sections must be investigated. In this manner, this investigation may at times be a rolling investigation, where multiple adjacent depths are sequentially analyzed:

Example 1: Initial Analysis and Sequential Investigation

Suppose the system conducts an initial analysis at depth n and determines it is a possible discontinuity. In this case, the system proceeds to check depth n+1 ($n_{u1}$).
If depth n+1 ($n_{u1}$) is found to be satisfactory ("perfect"), the system may then check depth n−1 to confirm that the problem at depth n is isolated.
If depth n−1 ($n_{d1}$) also shows a possible discontinuity, then the system proceeds to check depth n−2 ($n_{d2}$).
This rolling investigation continues until the system identifies a satisfactory depth or confirms the extent of the problematic section.

Example 2: Rolling Investigation to Confirm Issue Extent

The system initially analyzes depth n and finds it to be satisfactory. However, upon checking depth n+1 ($n_{u1}$), it is determined to include a possible discontinuity.
The system then checks depth n−1 ($n_{d1}$) to see if the issue is isolated or extends further.
If depth n−1 ($n_{d1}$) is satisfactory but depth n+2 ($n_{u2}$) suggests a possible discontinuity, the system recognizes a pattern and continues to investigate further depths [n+3 ($n_{u3}$), n−2 ($n_{d2}$), etc.) to map the full extent of the issue.
The investigation may reveal that depths n+2 ($n_{u2}$) and n+3 ($n_{u3}$) have possible discontinuities, while depths n+4 ($n_{u4}$) and beyond are satisfactory, helping to define the problematic section.

Example 3: Comprehensive Multi-Depth Analysis

The system starts with an analysis at depth n, finds it to be a "no go" with a possible discontinuity and immediately checks both adjacent depths, n+1 ($n_{u1}$) and n−1 ($n_{d1}$).
If both n+1 ($n_{u1}$) and n−1 ($n_{d1}$) are satisfactory, the system may conclude that the issue at depth n is isolated.
Conversely, if n+1 ($n_{u1}$) is satisfactory but n−1 ($n_{d1}$) is a "no go," the system will check n−2 ($n_{d2}$) to understand if the issue extends further downward.
This approach ensures that each identified issue is thoroughly investigated, ensuring no problematic sections are overlooked.

Example 4: Iterative Assessment With Dynamic Thresholds

Initially, the system conducts an analysis at depth n, identifying it as borderline satisfactory.

Given the borderline result, the system dynamically adjusts its thresholds for further examination and checks depths n+1 ($n_{u1}$) and n−1 ($n_{d1}$) with heightened sensitivity.

If depth n+1 ($n_{u1}$) is satisfactory but depth n−1 ($n_{d1}$) shows signs of degradation, the system continues to check n−2 ($n_{d2}$) and potentially further depths using these adjusted thresholds to ensure a more granular assessment.

This iterative approach, with dynamically adjusted thresholds based on initial findings, ensures a more precise and targeted investigation of potential issues.

Example 5: Integration With Historical Data for Predictive Analysis

Suppose the system has access to historical bond log data from similar wellbore conditions. An initial analysis at depth n identifies a "no go" section.

Leveraging library data (see libraries 158 of FIG. 2) including historical data, the system predicts that similar issues might extend over a typical range based on past occurrences.

Accordingly, the system preemptively checks a broader range, such as depths n+1 ($n_{u1}$) through n+3 ($n_{u3}$) and n−1 ($n_{d1}$) through n−3 ($n_{d3}$), to confirm or refute this prediction.

This historical data integration helps streamline the investigation process, ensuring comprehensive coverage while efficiently targeting likely problematic areas.

This rolling investigation approach ensures that the analysis is thorough and considers the variability in cement bonding conditions across different depths. By sequentially analyzing adjacent depths, the system can accurately identify and address any anomalies or issues that may arise in the wellbore casing. In this manner, the bond log analysis system employs a methodical, rolling investigation approach to thoroughly evaluate the integrity of cement bonding conditions. This approach not only identifies isolated issues but also maps the extent of any problems, providing a robust assessment of wellbore integrity. This multi-step process, from initial analysis to detailed examination, ensures the accurate identification of cement bonding conditions and discontinuities within the wellbore.

Once the vertical extent of the possible discontinuity or discontinuities is determined as presented above, if further examination is required, the system performs detailed analysis using multiple SDTs to confirm and elaborate on the findings, providing a thorough evaluation of the cement integrity around the wellbore casing. This multi-step process, from initial analysis to detailed examination, ensures the accurate identification of cement bonding conditions and discontinuities within the wellbore.

Figure 2:
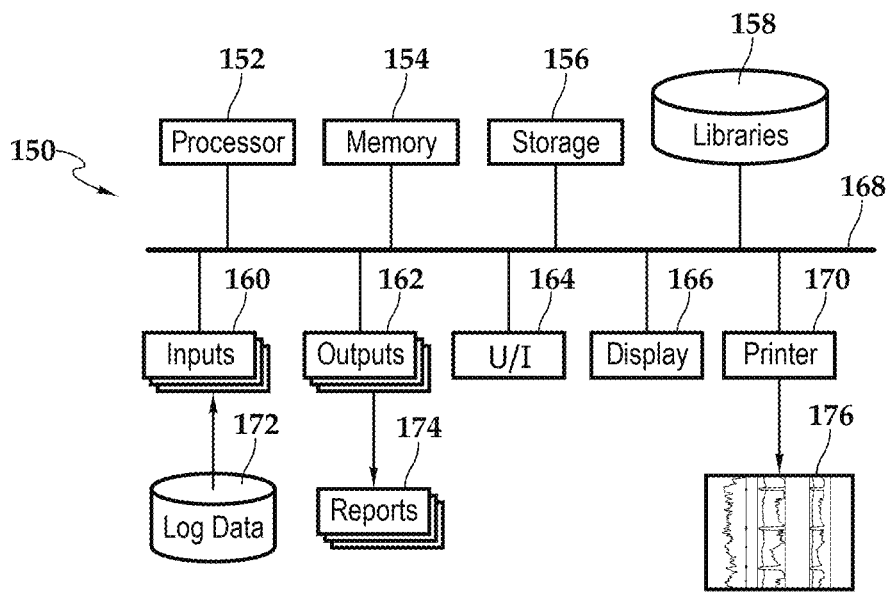
FIG. 2 is a functional block diagram depicting one embodiment of a bond logging analysis apparatus, according to the teachings presented herein.

Referring now to FIG. 2, one embodiment of a bond log data analysis system 150 includes a processor 152, memory 154, storage 156, libraries 158, inputs 160, outputs 162, a user interface 164, and a display 166, all interconnected by a busing architecture 168. The bond log data analysis system 150 can either be a standalone unit or integrated with a logging apparatus. The processor 152 executes instructions stored in the memory 154, storage 156, or libraries 158, enabling various analytical functions within the system 150. The memory 154 stores information and may be either volatile or non-volatile. The storage 156 provides mass storage capacity for the system. Libraries 158 contain data such as previous log interpretations within the same field, local geological data, density log waveforms, cement signature waveforms, historical data as to how cementing effected logs, formation change, lithology/formation types, and tool data and tool limitations. The libraries 158 also assist the system by containing signal analysis parameters, including various downhole signal parameters such as the length, radial distance, inclination angle, vertical position of discontinuities, and mechanical properties of the fill material, taking into account the casing string and cement.

The libraries 158 may include a collection of built-in analytics used for one-to-one or one-to-many correlations of signal parameters to determine the physical and geometric properties of discontinuities. The algorithmic capabilities within these libraries may be based on numerical solutions of generic forward problems that describe the system's response to various discontinuities.

In some embodiments, the libraries 158 within the bond log analysis system 10 categorize various cement bonding conditions and anomalies based on distinct characteristics observed in the bond log data. These categories include Good Cement Bond Conditions, characterized by the absence of strong, straight casing signals and chevron patterns at the casing collars, and the presence of several strong formation signals, indicating effective cement bonding. Transition Zones and Mixed Conditions are marked by a transition in the strength of casing signals, the appearance or disappearance of chevron patterns at the casing collars, or a change in amplitude, suggesting varying degrees of cement integrity. Potential Issues or Anomalies are further subclassified into specific conditions such as Flow Channels, which are identified by patterns suggesting potential pathways for fluid flow; Material or Bonding Failures, indicated by the loss or weakening of formation signals or signs of debonding of cement from the casing; and Material or Formation Anomalies, characterized by patterns suggesting irregularities in the wellbore material or formation.

Inputs 160 and outputs 162 facilitate data exchange within the bond log data analysis system 150. Inputs 160 receive data signals processed by the processor 152 and stored in memory 154, while outputs 162 transmit processed data, reports, or visualizations. Inputs 160 enable the reception of log data 172, and outputs 162 support the generation of reports 174, for example, which can be printed by printer 170 to produce an annotated bond log 176.

The non-transitory memory 154 and storage 156, accessible to the processor 152, store processor-executable instructions. When executed, these instructions direct the processor to perform several tasks. For example, the processor 152 receives a Cement Bond Log (CBL) that includes a Variable Density Log (VDL) and at least one Secondary Data Track (SDT) through inputs 160. These inputs facilitate communication and data transfer from downhole tools. The processor 152 then processes the received measurements using algorithms and parameters from the libraries 158 specifically designed for VDL analysis.

Upon examining the VDL, the processor 152 identifies characteristics and patterns related to cement bonding conditions. This examination includes analyzing signal patterns, amplitude, frequency, deformation, and strength within the VDL data, which includes one or more VDL signals, at depth n; applying filtering and transformation techniques to the VDL signal to extract specific features; and comparing the identified characteristics and patterns to predefined thresholds and patterns stored in a database to determine if a possible discontinuity exists. This examination utilizes predefined parameters stored in the libraries 158, which outline typical patterns for various cement bond conditions. The processor 152 classifies these observations into categories such as good cement bond conditions, transition zones, mixed conditions, and potential issues or anomalies, based on predetermined criteria. If a possible discontinuity exists, the processor 152 determines the vertical extent of the possible discontinuity by sequentially analyzing VDL data, including VDL signals within the VDL data, from adjacent depths uphole and downhole from depth n. For the vertical extent of the possible discontinuity, the processor 152 performs an analysis across the vertical extent using data from at least one Secondary Data Track (SDT). This detailed analysis includes correlating the SDT data with the VDL data at the identified depths to characterize specific cement bonding issues and applying signal processing techniques to enhance the accuracy of the SDT analysis. The processor 152 then synthesizes the VDL and SDT data to identify characteristics and patterns related to cement bonding conditions across the examined depths and generates data for a comprehensive report summarizing the cement integrity around a wellbore casing, including the findings at the identified depths.

Following the classification and any additional analysis, the processor 152 generates the comprehensive report 176 summarizing the cement integrity around the wellbore casing. This report is transmitted through outputs 162 and can be displayed on the display 166 or printed as a hardcopy report by printer 170, as shown by element 176. Additionally, the processor 152 may execute instructions to create visual representations of the VDL and the associated classifications, which can be displayed on the user interface 164 for user-friendly inspection and evaluation.

The bond log data analysis system 150 is capable of using bond log data from various logging tools, including Gamma Ray logs, resistivity logs, and neutron-density logs. These tools provide complementary data that support and enhance the VDL-based analysis. Furthermore, the processor-executable instructions can enable the processor 152 to implement machine learning techniques, which continuously refine and improve the accuracy of the cement bond classification process by analyzing both historical and newly acquired data. This adaptive learning process enhances the system's efficiency and accuracy over time.

Figure 3:
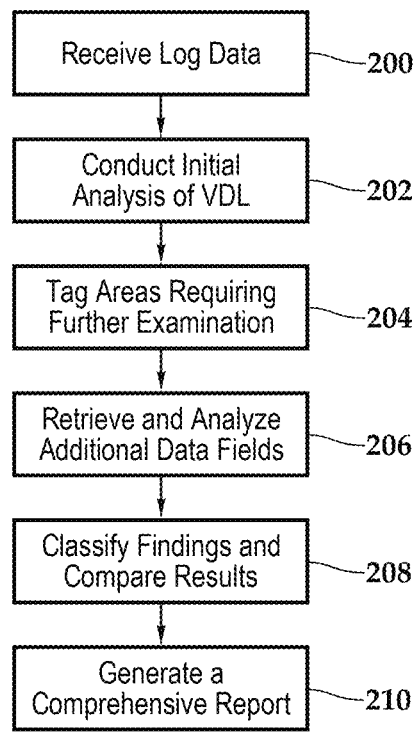
FIG. 3 is a flow chart depicting one embodiment of a method for bond logging analysis, according to the teachings presented herein.

Referring now to FIG. 3, wherein one embodiment of a methodology is presented. At block 200, log date is received. The process begins with the system receiving log data from various logging tools. This data typically includes the CBL, which comprises the VDL and any other relevant logs such as the SDT or SDTs. The input is configured to handle these digital files, ensuring they are in a format suitable for further processing and analysis.

At block 202, an initial analysis of the VDL is conducted. Once the log data is received, the system conducts an initial analysis of the VDL. The VDL is a critical component of the bond log data, providing detailed information about the cement bonding conditions around the wellbore casing. The initial analysis involves examining the VDL to identify any characteristics and patterns that might indicate issues with the cement bond. This step focuses on analyzing the data at various depths, such as adjacent depths, to ensure a targeted and efficient examination. The initial analysis sets the stage for identifying areas that may require further investigation.

At block 204, areas requiring further examination are tagged. Following the initial VDL analysis, the system tags areas that require further examination. This involves marking specific depths or sections of the wellbore where the initial analysis has identified potential issues. Tagging these areas allows the system to focus subsequent analyses on these regions, ensuring that any anomalies or irregularities are thoroughly investigated. This step is crucial for prioritizing resources and attention on the most critical sections of the wellbore, enhancing the efficiency and effectiveness of the analysis process.

At block 206, additional data fields are retrieved and analyzed, such as data from the SDT or SDTs. After tagging the areas of interest, the system retrieves and analyzes additional data fields. These additional data fields may include logs such as amplitude, gamma ray, resistivity, and other relevant measurements. Analyzing these additional data fields provides a more comprehensive understanding of the cement bonding conditions at the tagged areas. The system correlates the additional data with the initial VDL findings to gain deeper insights into the potential issues. This step enhances the accuracy and reliability of the analysis by leveraging multiple sources of data.

At block 208, findings are classified and results compared. With the additional data analyzed, the system classifies the findings based on the identified characteristics and patterns. This classification involves categorizing the results into different types of issues or conditions, such as good cement bonding, potential micro-annuli, or other anomalies. The system then compares these findings with predefined thresholds and patterns stored in a database. This comparison helps in validating the results and determining the significance of the identified issues. Classifying and comparing the findings ensures that the analysis is thorough and consistent with industry standards.

At block 210, a comprehensive report is generated. The final step in the simplified flowchart is generating a comprehensive report summarizing the findings of the bond log analysis. The report includes detailed information about the cement integrity around the wellbore casing, highlighting any identified issues and their potential impact. It provides a structured and organized presentation of the analysis results, making it easy for engineers and decision-makers to understand and act upon the findings. The report also includes visual representations of the analyzed data, such as graphs, charts, and diagrams, to aid in the interpretation of the results. This comprehensive report serves as a crucial tool for ensuring the safety and effectiveness of wellbore operations.

Figure 4:
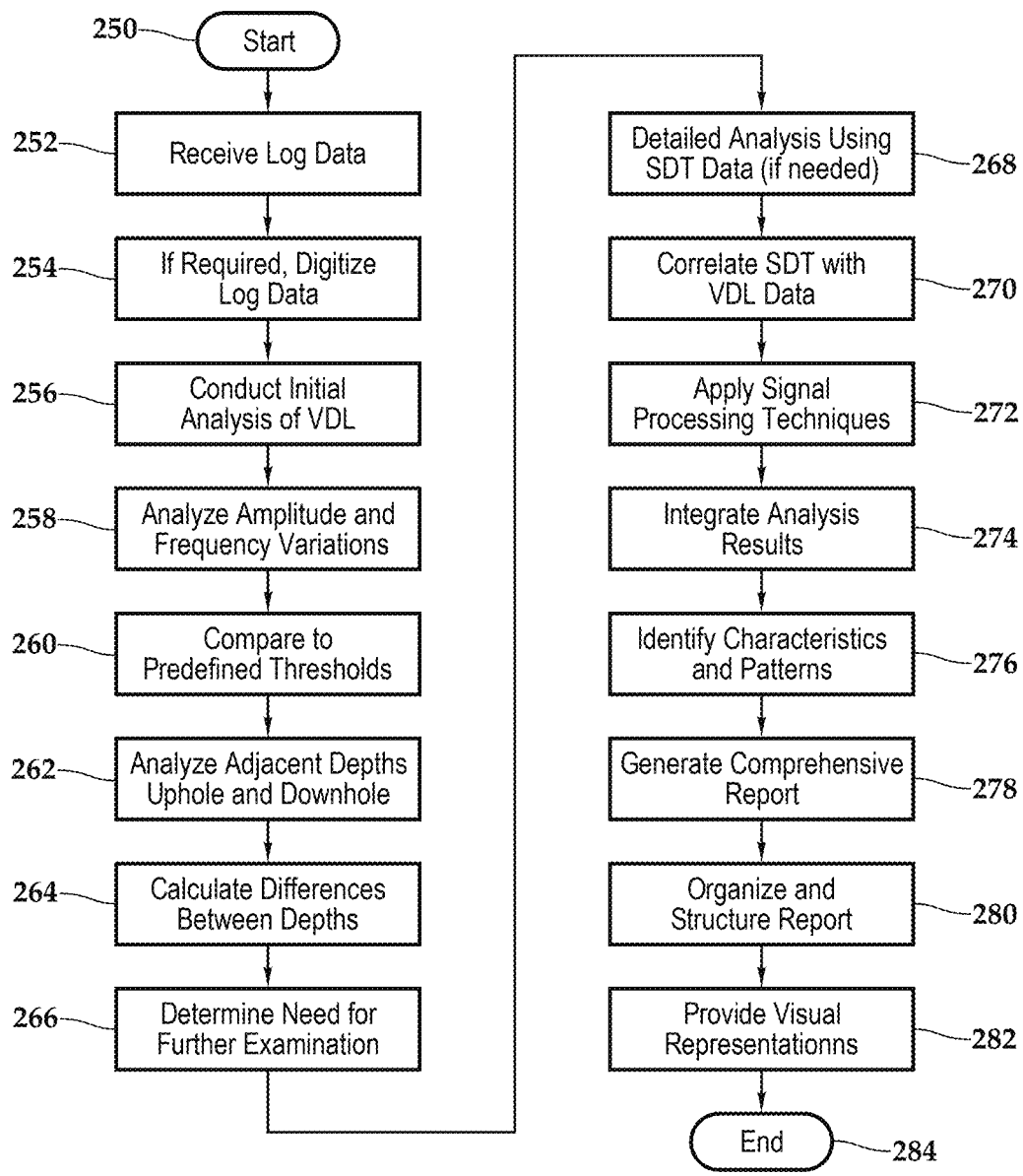
FIG. 4 is a further flow chart depicting one embodiment of a method for bond logging analysis, according to the teachings presented herein.

Referring now to FIG. 4, wherein a further embodiment of the methodology is depicted. At block 250, the bond log analysis system is initialized, which may include loading configuration settings, verifying data sources and connectivity, authenticating the user, and preparing for data ingestion, for example. This ensures the system is ready to receive CBL data, including VBL and SDT or SDTs. At block 252, log data is received and more particularly, at block 254, if required, the data is digitized. Continuing with blocks 252-254, the process continues with the system receiving CBL data in digital format. This data includes the VDL and at least one SDT. The system's input is configured to handle these digital files, ensuring they are in a format suitable for further processing and analysis. This step sets the foundation for all subsequent analyses by ensuring the data is correctly received and formatted.

At block 256, initial VDL analysis is undertaken. Once the digital log data is received, the system conducts an initial analysis of the VDL data, including VDL signals therein, at a specified depth, referred to as depth n. This initial analysis involves examining the VDL to identify any characteristics and patterns that might indicate issues with the cement bonding. The focus is on analyzing the data at a specific depth to ensure a targeted and efficient examination.

At block 258, in some embodiments, amplitude and frequency variations are analyzed. During the initial VDL analysis, the system specifically analyzes the amplitude and frequency variations within the VDL signals of the VDL data at depth n. This involves scrutinizing the waveforms to detect any irregularities or anomalies that could suggest problems with the cement bond. By focusing on these variations, the system can accurately identify potential issues that require further investigation. Continuing with block 260, after identifying characteristics and patterns in the VDL data, the system compares these findings to predefined thresholds and patterns stored in a database. These thresholds and patterns are established based on historical data and expert knowledge, providing a benchmark against which the current data can be evaluated. This comparison helps in determining the significance of the identified anomalies and whether they warrant further examination, such as warranted by possible discontinuities.

At block 262, adjacent depths—uphole and/or downhole—are analyzed. This step involves analyzing the VDL signals within the VDL data from adjacent depths, both uphole and downhole from depth n. This analysis helps in understanding the context of the identified anomalies by comparing them with the data from neighboring depths. By doing so, the system can determine if the anomalies at depth n are isolated incidents or part of a broader pattern. At block 264, differences between the depths are calculated. In this step, the system calculates the differences in amplitude and frequency variations between depth n and the adjacent depths. This calculation is based on predefined criteria, which are designed to highlight significant discrepancies that may indicate a problem. By quantifying these differences, the system can make a more informed decision about the need for further examination.

At block 266, the need for further examination is determined. Based on the analysis of the adjacent depths and the calculated differences, the system determines whether further examination at depth n is necessary. This decision is made using a decision tree or similar logic, which evaluates the significance of the findings against predefined thresholds. If the discrepancies are deemed significant, the system proceeds to the next step; otherwise, it concludes that no further examination is needed at this depth.

If needed, detailed analysis using SDT data is performed at block 268. If further examination is deemed necessary, the system performs a detailed analysis of depth n using the SDT data. This secondary analysis involves a more thorough examination of the cement bonding conditions at the specified depth, leveraging the additional data provided by the SDT. The goal is to gain a deeper understanding of the identified anomalies and confirm their nature and severity.

At block 270, during the detailed analysis, the system correlates the SDT data with the VDL data at depth n. This correlation involves matching the secondary data track with the initial VDL findings to identify specific cement bonding issues. By integrating the two datasets, the system can provide a more comprehensive and accurate assessment of the cement integrity at the specified depth. At block 272, to enhance the accuracy of the SDT analysis, the system applies advanced signal processing techniques. These techniques may include filtering, noise reduction, and other methods designed to improve the clarity and reliability of the data. By refining the SDT data, the system ensures that the detailed analysis is based on the most accurate and reliable information available.

At block 272, analysis results are integrated. This next step involves integrating the results from both the VDL and SDT analyses. This integration synthesizes the findings from the initial and detailed analyses, providing a holistic view of the cement bonding conditions at depth n. By combining the data from multiple sources, the system can offer a more comprehensive assessment of the cement integrity. At block 274, following the integration of the analysis results, the system identifies the key characteristics and patterns related to the cement bonding conditions at depth n. This step involves recognizing specific signatures in the data that indicate issues such as poor bonding, micro-annuli, or other anomalies. These identified patterns are crucial for understanding the overall integrity of the cement bond. At block 276, with the analysis complete, the system generates a comprehensive report summarizing the cement integrity around the wellbore casing. This report includes detailed findings from both the VDL and SDT analyses, highlighting any identified issues and their potential impact. The report serves as a crucial tool for engineers and decision-makers, providing them with the information needed to address any problems.

At block 278, a report is organized and structured. The generated report is organized and structured in a clear and logical format. This involves categorizing the identified issues and characteristics, and presenting them in a way that is easy to understand and interpret. The structured report ensures that all relevant information is readily accessible to the users. At block 280, visual representations are provided. To enhance the clarity and utility of the report, the system provides visual representations of the analyzed data. These visual aids, such as graphs, charts, and diagrams, help engineers quickly grasp the findings and make informed decisions. Visual representations are particularly useful for highlighting key trends and anomalies in the data.

At block 282, the process concludes with the generation and delivery of the comprehensive report. At this point, the system has completed its analysis and provided the necessary information to the stakeholders. The end of the process is marked by a checkered flag or similar icon, indicating that all steps have been successfully completed.

Figure 5:
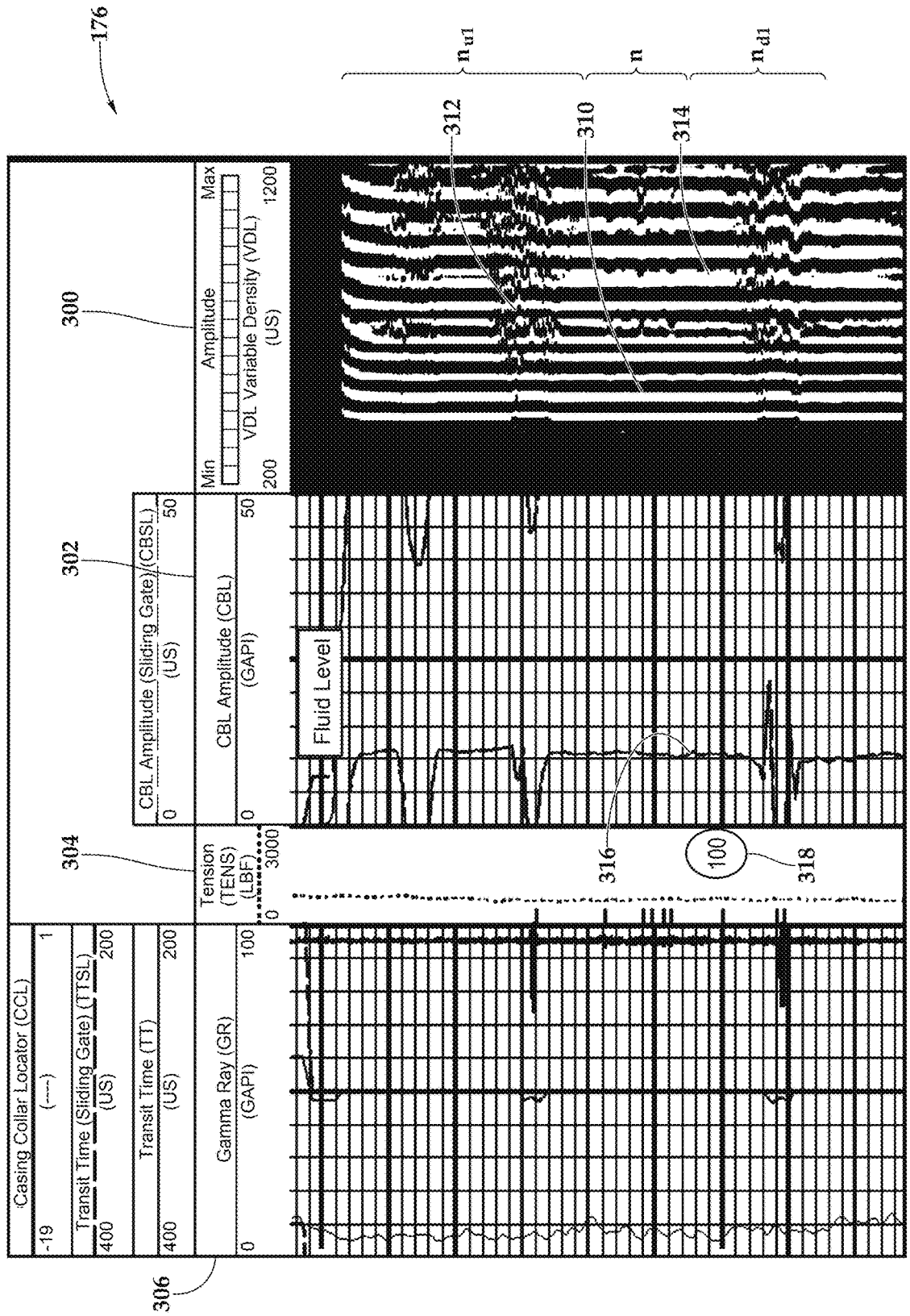
FIG. 5 is graphical representation of one embodiment of a log produced by the logging apparatus and method for use of the same.

Referring now to FIG. 5, as discussed, the bond log analysis system and method for use of the same may produce the annotated bond log 176, which is a CBL. In particular, FIG. 5 illustrates one example of a bond log representative of a scenario which may be described as "Free Pipe (No Cement)." The annotated bond log 176 includes a VDL 300 and three secondary SDTs 302, 304, 306, including amplitude data 302, tension data 304, and gamma ray data 306, respectively. As shown, initially the VDL 300 was analyzed at depth n with adjacent depths of $n_{u1}$ uphole and $u_{d1}$ downhole analyzed. Points 310, 312, 314 were noteworthy. This analysis indicated further analysis was necessary and data points 316, 318 associated with depth $n_{d1}$ with the SDTs having amplitude data 302 and tension data 304 were examined.

The depicted bond log 176 has a number of characteristic features that signify this particular scenario. The most notable characteristic of the bond log is the presence of a "ringing" chevron pattern located at the casing collars, depicted by element 312. This pattern can be observed as a series of arching lines that intersect at a point, resembling a chevron or "V" shape. This distinctive pattern is an indication of an echo from the casing collar, suggesting the absence of any cement bond.

Element 314 illustrates strong casing signals, which manifest as several straight lines throughout the log. These signals demonstrate the acoustic energy being reflected back to the logging tool directly through the casing, which is an indication that there is no strong cement bond to absorb this energy. The bond log also exhibits a high amplitude value, as indicated by element 316. In this case, the amplitude is uniformly consistent and reaches a value of 62 mV, and the free pipe will have a high amplitude matches the theoretical "free pipe" amplitude for a 7" casing, indicating a lack of cement around the casing.

Additionally, element 310 highlights the absence of any crooked lines, which signifies that no formation signals can be observed. Formation signals, typically manifesting as irregular or crooked lines, are often visible when cement is present and bonding well with the formation. Their absence supports the free pipe scenario. Finally, element 318 indicates that the location of these characteristics on the bond log corresponds with a depth where free pipe (no cement) is expected. This alignment of location with the observed features lends further credence to the identification of the log as representative of a free pipe scenario.

In summary, the systematic approach involves initially assessing predefined depth sections. If further examination is required, the system performs detailed analysis using multiple SDTs to confirm and elaborate on the findings, analyze adjacent depth sections providing a thorough evaluation of the cement integrity around the wellbore casing. This multi-step process, from initial analysis to detailed examination, ensures the accurate identification of cement bonding conditions and discontinuities within the wellbore.

Figure 6:
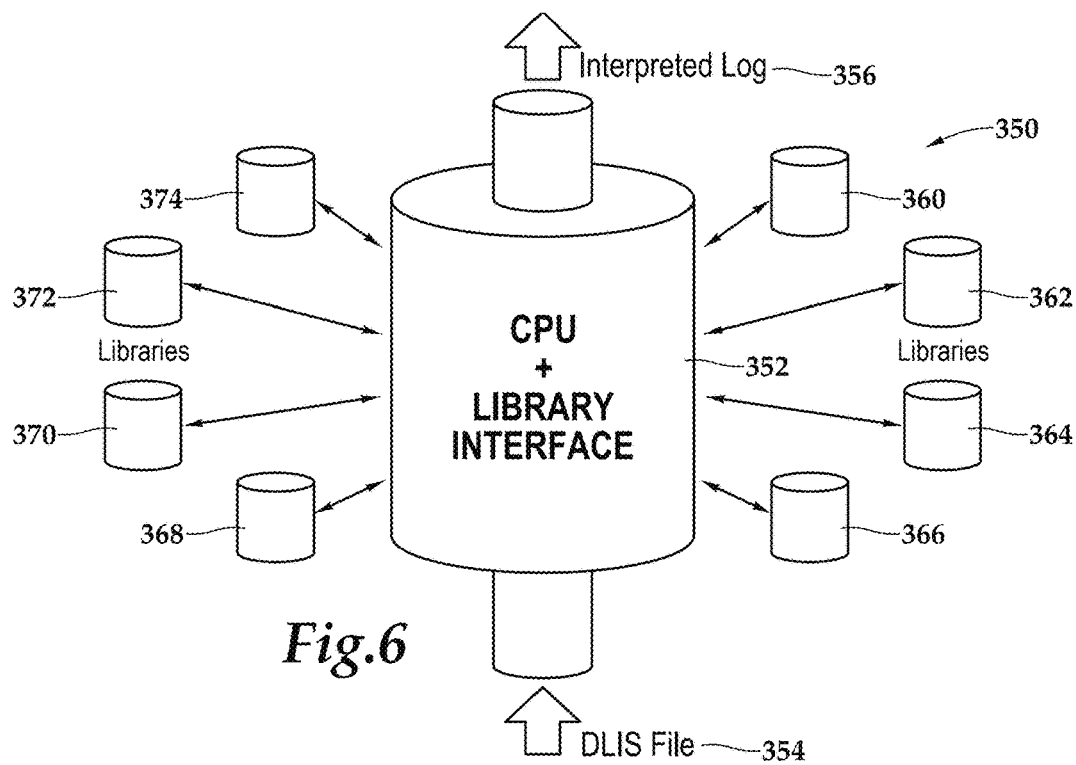
FIG. 6 is a schematic block diagram depicting one embodiment of a theoretical architecture for a bond-log interpretation system.

Referring now to FIG. 6, therein is shown one embodiment of a theoretical architecture for a General Bond Log Interpreter (GBLI) system 350. At the center of the diagram, a cylindrical processing core 352 houses a CPU+LIBRARY INTERFACE that orchestrates all data flow. The cylindrical processing core 352 receives raw down-hole measurements through a downward-pointing Digital Log Interchange Standard (DLIS) input arrow 354, converts the measurements into a normalized internal format, and outputs an upward-pointing interpreted-log arrow 356 that represents the system's finalized cement-bond evaluation.

Surrounding the processing core are a plurality of modular libraries, each depicted as a cylindrical data store. Beginning at the leftmost position and proceeding clockwise, the libraries include a Lithology Library 360, a Casing-Tally Library 362, a Cementing-Data Library 364, a Survey Library 366, a Logging-Data Library 368, a Caliper Library 370, a Previous-CBLs Library 372, and a Logging-Tool-Specifications Library 374. In some embodiments, the Lithology Library 360 stores formation-specific rock and fluid properties—such as acoustic impedance, porosity, and lithofacies—that allow the interpreter to tailor bond-log thresholds to local geology. The Casing-Tally Library 362 maintains detailed casing schematics, including pipe sizes, grades, and collar depths, so the system can match tool responses to actual geometry at every measured depth.

The Cementing-Data Library 364 captures slurry recipes, pump schedules, and job-quality metrics, enabling correlation of observed bond anomalies with known cement-placement conditions. The Survey Library 366 holds well-trajectory data (inclination, azimuth, true-vertical-depth mapping) to align log depths accurately and compensate for deviation-related signal distortions. Complementing these, the Logging-Data Library 368 aggregates synchronous down-hole measurements—gamma ray, resistivity, neutron-density, and more—for multi-track correlation during discontinuity confirmation. The Caliper Library 370 supplies borehole-diameter profiles and ovality statistics to help distinguish true cement defects from washouts or out-of-gauge sections. Historical context is furnished by the Previous-CBLs Library 372, which archives interpreted waveforms and outcomes from offset wells, providing templates and machine-learning training sets to refine thresholds. Finally, the Logging-Tool-Specifications Library 374 lists response functions, frequency ranges, and calibration constants for various vendors' CBL/VDL tools, allowing the engine to normalise raw data regardless of hardware. Each library can be individually enabled, disabled, or updated under control of the library interface in the processing core 350. Bidirectional links between the core and the libraries allow the interface to add, subtract, manipulate, or transfer data as needed to support real-time analysis.

Figure 7:
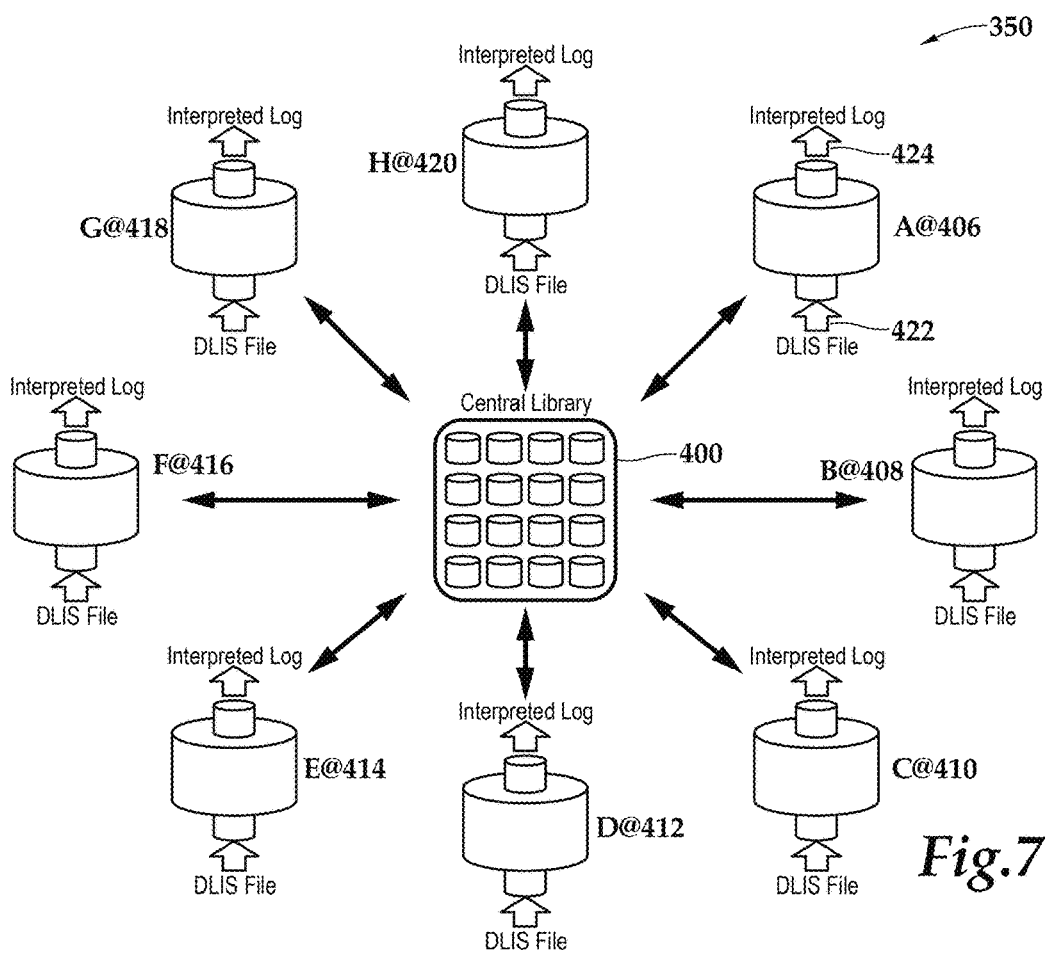
FIG. 7 is a schematic illustration of an operational architecture in which multiple field-deployed bong-log interpretation systems are networked to a central library repositor.

Referring now to FIG. 7, one embodiment of an operational architecture for deploying the General Bond Log Interpreter (GBLI) 350 across multiple wells is illustrated. At the heart of the network is a central library repository 400, housed on an operator-controlled server cluster that stores lithology, casing, cementing, and other reference datasets. The repository 400 may be physically located at an operator headquarters, which also hosts a real-time dashboard for cross-well analytics and fleet management.

A secure communications network connects the central repository 400 to a plurality of geographically distributed field units. Three representative sites are shown: Field Site A GBLI unit 406, Field Site B GBLI unit 408, Field Site C GBLI unit 410, Field Site D GBLI unit 412, Field Site E GBLI unit 414, Field Site F GBLI unit 416, Field Site G GBLI unit 418, and Field Site H GBLI unit 420. Each GBLI unit comprises the processing core described in FIG. 6 together with an optional edge cache that stores time-critical slices of the central library for offline resilience.

At every field site, with Field Site A GBLI unit 406 as an example, a downward-pointing DLIS input arrow 422 indicates ingestion of raw cement-bond logging data from the local well. After on-site processing, an upward-pointing interpreted-log arrow 424 feeds results to the rig operator and, simultaneously, back to the dashboard for centralized oversight. Bidirectional library-sync arrows represent encrypted, near-real-time transfer of library updates and derived analytics between each GBLI unit (406, 408, 410, 412, 414, 416, 418, 420) and the repository 400. This architecture enables parallel analysis of n wells, ensures all GBLI units operate from a single authoritative data set, and simplifies data management, version control, and cross-referencing across an operator's entire asset portfolio.

By encapsulating well-specific and historical datasets in discrete, toggleable repositories, the architecture of FIG. 6 permits rapid re-configuration for disparate well conditions and tool vendors while maintaining a single, consistent interpretation engine. This modular approach also simplifies version control and facilitates future expansion to additional data domains without altering the core processing logic.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description.

It is, therefore, intended that the appended claims encompass any such modifications or embodiments.

What is claimed is:

1. A non-transitory computer-readable medium storing instructions that, when executed by a wellbore casing bond log data interpretation system having a processor non-transitory memory, storage, a digital-log input, outputs, a user interface, and a display, cause the wellbore casing bond-log interpretation system to:
   receive, via a digital-log input, a Digital Log Interchange Standard (DLIS) file including a single Cement Bond Log (CBL) for a wellbore casing, the CBL containing Variable Density Log (VDL) data and at least one Secondary Data Track (SDT) recorded concurrently with the VDL data;
   for each of a plurality of discrete depths represented in the VDL data, perform an initial VDL-only assessment in each depth segment that classifies the depth segment as clear or possible discontinuity;
   tag every depth classified as having a possible discontinuity; and
   for each tagged depth, analyze the corresponding SDT data together with the VDL data by applying reference data obtained from a plurality of discrete, toggleable data libraries comprising at least a lithology library, a casing-tally library, a cementing-data library, and a previous-CBL library, to:
      determine a probable cause of the possible discontinuity, and
      re-classify the depth as clear or confirm the possible discontinuity;
      compare and group confirmed discontinuities according to their vertical positions in the CBL to delineate one or more imperfect intervals; and
      generate an annotated cement-integrity bond log report that synthesizes results from the VDL and SDT analyses and summarizes cement integrity of the wellbore casing.

2. The computer-readable medium of claim 1, further comprising instructions to selectively enable or disable each data library through the library-interface module, such that only enabled libraries contribute reference data to the assessments and the report.

3. The computer-readable medium of claim 1, wherein the CPU records, in metadata of the report, an audit trail identifying which data libraries were enabled during the assessments.

4. The computer-program product computer-readable medium of claim 1, wherein thresholds used in the initial VDL-only assessment are retrieved from the previous-CBL library and are updated dynamically as new interpreted logs are added.

5. The computer-readable medium of claim 1, wherein the SDT analysis applies signal-processing techniques that include filtering, noise reduction, and waveform enhancement prior to determining the probable cause of the possible discontinuity.

6. The computer-readable medium of claim 1, further comprising instructions to synchronize each data library with a central repository over a secure network before the VDL-only assessment begins.

7. The computer-readable medium of claim 1, wherein the report includes visual representations selected from annotated depth tracks, amplitude-frequency scatter plots, or color-mapped cement-integrity logs.

8. The computer-readable medium of claim 1, wherein disabling the lithology library causes the processor to omit lithology-based correction factors from the SDT analysis while retaining casing-tally and cementing-data corrections.

9. The computer-readable medium of claim 1, wherein the wellbore casing bond log data interpretation system is configured for at least one of:
   (i) distributed well-site GBLI units analyze DLIS files locally while synchronizing their libraries with a central library repository; and
   (ii) DLIS files from the well sites are transmitted via a secure network to a central GBLI that both hosts the central library repository and performs the analyses.

10. A non-transitory computer-readable medium storing instructions that, when executed by a wellbore casing bond log data interpretation system having a processor non-transitory memory, storage, a digital-log input, outputs, a user interface, and a display, cause the wellbore casing bond-log interpretation system to:
   receive, via a digital-log input, a Digital Log Interchange Standard (DLIS) file including a single Cement Bond Log (CBL) for a wellbore casing, the CBL containing Variable Density Log (VDL) data and at least one Secondary Data Track (SDT) recorded concurrently with the VDL data;
   for each of a plurality of discrete depths represented in the VDL data, perform an initial VDL-only assessment that classifies the depth as clear or possible discontinuity;
   tag every depth classified as having a possible discontinuity; and
   for each tagged depth, analyze the corresponding SDT data together with the VDL data by applying reference data obtained from a plurality of discrete, toggleable data libraries comprising at least a lithology library, a casing-tally library, a cementing-data library, and a previous-CBL library, to:
      determine a probable cause of the possible discontinuity, and
      re-classify the depth as clear or confirm the possible discontinuity;
      compare and group confirmed discontinuities according to their vertical positions in the CBL to delineate one or more imperfect intervals; and
      generate an annotated cement-integrity bond log report that synthesizes results from the VDL and SDT analyses and summarizes cement integrity of the wellbore casing;
   wherein the wellbore casing bond log data interpretation system comprises a processing core located at a well site, the processing core including the processor, memory, storage, and the library-interface module with the plurality of discrete, toggleable data libraries stored locally such that the received DLIS file is analyzed on-site, the processing core being in communication with a bond logging apparatus at the wellbore casing.

11. The computer-readable medium of claim 10, further comprising instructions to selectively enable or disable each data library through the library-interface module, such that only enabled libraries contribute reference data to the assessments and the report.

12. The computer-readable medium of claim 10, wherein the CPU records, in metadata of the report, an audit trail identifying which data libraries were enabled during the assessments.

13. The computer-program product computer-readable medium of claim 10, wherein thresholds used in the initial VDL-only assessment are retrieved from the previous-CBL library and are updated dynamically as new interpreted logs are added.

14. The computer-program product computer-readable medium of claim 10, wherein the SDT analysis applies signal-processing techniques that include filtering, noise reduction, and waveform enhancement prior to determining the probable cause of the possible discontinuity.

15. The computer-program product computer-readable medium of claim 10, further comprising instructions to synchronize each data library with a central repository over a secure network before the VDL-only assessment begins.

16. A non-transitory computer-readable medium storing instructions that, when executed by a wellbore casing bond log data interpretation system having a processor non-transitory memory, storage, a digital-log input, outputs, a user interface, and a display, cause the wellbore casing bond-log interpretation system to:
    receive, via a digital-log input, a Digital Log Interchange Standard (DLIS) file including a single Cement Bond Log (CBL) for a wellbore casing, the CBL containing Variable Density Log (VDL) data and at least one Secondary Data Track (SDT) recorded concurrently with the VDL data;
    for each of a plurality of discrete depths represented in the VDL data, perform an initial VDL-only assessment that classifies the depth as clear or possible discontinuity;
    tag every depth classified as having a possible discontinuity; and
    for each tagged depth, analyze the corresponding SDT data together with the VDL data by applying reference data obtained from a plurality of discrete, toggleable data libraries comprising at least a lithology library, a casing-tally library, a cementing-data library, and a previous-CBL library, to:
        determine a probable cause of the possible discontinuity, and
        re-classify the depth as clear or confirm the possible discontinuity;
        compare and group confirmed discontinuities according to their vertical positions in the CBL to delineate one or more imperfect intervals; and
        generate an annotated cement-integrity bond log report that synthesizes results from the VDL and SDT analyses and summarizes cement integrity of the wellbore casing;
    wherein the wellbore casing bond log data interpretation system comprises a plurality of field-deployed units each including the processor and a library-interface module coupled to the discrete, toggleable libraries, the plurality of field-deployed units being communicatively coupled to a central library repository over a secure communications network, the central library repository storing reference datasets and synchronizing library updates and derived analytics across the field-deployed units.

17. The computer-readable medium of claim 16, further comprising instructions to selectively enable or disable each data library through the library-interface module, such that only enabled libraries contribute reference data to the assessments and the report.

18. The computer-readable medium of claim 16, wherein the CPU records, in metadata of the report, an audit trail identifying which data libraries were enabled during the assessments.

19. The computer-program product computer-readable medium of claim 16, wherein thresholds used in the initial VDL-only assessment are retrieved from the previous-CBL library and are updated dynamically as new interpreted logs are added.

20. The computer-program product computer-readable medium of claim 16, wherein the SDT analysis applies signal-processing techniques that include filtering, noise reduction, and waveform enhancement prior to determining the probable cause of the possible discontinuity.

21. The computer-program product computer-readable medium of claim 16, further comprising instructions to synchronize each data library with a central repository over a secure network before the VDL-only assessment begins.

22. A non-transitory computer-readable medium storing instructions that, when executed by a central bond log interpretation system comprising a processor, non-transitory memory, storage, a digital-log input, outputs, a user interface, and a display, cause the central bond log interpretation system to:
    receive, via a network, a plurality of Digital Log Interchange Standard (DLIS) files transmitted from distributed well sites, each DLIS file including a Cement Bond Log (CBL) containing Variable Density Log (VDL) data and at least one Secondary Data Track (SDT) recorded concurrently with the VDL data;
    for each received CBL, perform an initial VDL-only assessment for each depth segment that classifies the segment as clear or possible discontinuity;
    tag every segment classified as having a possible discontinuity;
    for each tagged segment, analyze the corresponding SDT data together with the VDL data by applying reference data obtained from a plurality of discrete, toggleable data libraries comprising at least a lithology library, a casing-tally library, a cementing-data library, and a previous-CBL library stored in the central library repository;
    determine a probable cause of the possible discontinuity and re-classify the segment as clear or confirm the possible discontinuity;
    compare and group confirmed discontinuities according to their vertical positions in the CBL to delineate one or more imperfect intervals; and
    generate an annotated cement-integrity bond log report for each wellbore casing that synthesizes results from the VDL and SDT analyses and summarizes cement integrity,
    wherein the central bond log interpretation system maintains the central library repository serving as the sole source of reference data for analyses of all received DLIS files.

23. The computer-readable medium of claim 22, further comprising instructions to selectively enable or disable each library in the central library repository such that only enabled libraries contribute reference data to the assessments and reports.

24. The computer-readable medium of claim 22, wherein the processor records, in metadata of each report, an audit trail identifying which libraries and versions in the central library repository were enabled during the assessments.

25. The computer-readable medium of claim 22, wherein thresholds used in the initial VDL-only assessment are retrieved from the previous-CBL library in the central library repository and updated dynamically as new interpreted logs are added.

26. The computer-readable medium of claim 22, wherein the annotated cement-integrity bond log report includes visual representations selected from annotated depth tracks, amplitude-frequency scatter plots, or color-mapped cement-integrity logs.

* * * * *